United States Patent

[11] 3,631,722

[72] Inventor John Richard B. Steacie
Carleton Place, Ontario, Canada
[21] Appl. No. 839,353
[22] Filed July 7, 1969
[45] Patented Jan. 4, 1972
[73] Assignee Leigh Instruments Limited
Ontario, Canada

[54] NONLINEAR COUNTER
8 Claims, 6 Drawing Figs.
[52] U.S. Cl. .................................................... 73/386
[51] Int. Cl. .................................................... G01l 7/12
[50] Field of Search ............................................ 73/384,
386, 387, 393

[56] References Cited
UNITED STATES PATENTS
2,782,639 2/1957 Appleby .................. 73/386
3,222,932 12/1965 Henneman ................ 73/386

*Primary Examiner*—Donald O. Woodiel
*Attorney*—Smart & Biggar

ABSTRACT: A device for converting input rotary motion to output rotary motion according to nonlinear function, having a cylindrical cam with a curved way (input) and annular cam follower (output) sliding on the cam and following the curved way, and a threaded pinion meshing with the cam follower and constraining it to move axially along the cam as the cam follower rotates.

An altimeter having a pressure-altitude barometric pressure setting mechanism including the aforesaid rotary converter.

PATENTED JAN 4 1972

INVENTOR
J. RICHARD B. STEACIE

BY *Smart & Biggar*

ATTORNEYS 3,631,722

NONLINEAR COUNTER

Background of the Invention

The present invention relates to a nonlinear rotary mechanism in or for use with the altitude-pressure indicating mechanism of an altimeter.

Some functional relationships required in mechanical apparatus of various kinds are nonlinear. This means, simply, that for any given input motion, an output motion is required that is not exactly proportional to the input motion. Devices are known for converting an input motion to an output motion according to a nonlinear functional relationship, the most common of which involve some kind of cam and cam-follower arrangement.

Where the input motion is rotary motion and involves more than one revolution of the input shaft, a convenient means for obtaining a rotary output motion of greater than one revolution and which varies in a nonlinear and nonperiodic manner with the input motion, has presented problems to designers.

An instance of a nonlinear functional relationship involving rotary motion of the aforesaid kind arises in the instrumentation of altimeters, particularly for aircraft. In a barometric altimeter, altitude varies with prevailing atmospheric pressure in a nonlinear manner. When aircraft are in the air, they may travel several hundreds or even thousands of miles within a few hours, during which time the atmospheric pressure prevailing in the vicinity of the aircraft may change drastically. In order to simplify flying procedures, all airborne aircraft operate on the basis of assumed atmospheric pressure of 29.92 inches of mercury. However, this standard pressure may not be the actual pressure prevailing at an airport, and, of course, it is vital that the aircraft pilot be aware of the exact height above sea level of the runway that he is approaching, in order to insure a safe landing. Accordingly, means in the nature of a barometric setting device must be provided for introducing into the altimeter an adjustable datum pressure input which can be set to the specifications of the aircraft controller at the airport at which the aircraft is about to land (or from which it is about to take off) in dependence upon the prevailing atmospheric pressure at the airport, and which will be reflected in a correct altitude reading for the airport runway in question.

It is convenient in the design of altimeters to indicate datum atmospheric pressure, in inches of mercury taken to the nearest one-hundredth of an inch, on a conventional Veeder-type counter. An adjustable input control, such as a rotatable shaft to which a knob is attached, may be suitably provided for setting the Veeder-type counter to the standard en route flying pressure of 29.92 inches of mercury or to a specified datum pressure. To guard against the possibility of extreme cases, the adjustment range should be from about 28.00 inches of mercury to about 31.50 inches of mercury. Because the desired altitude correction does not vary in a linear manner with the variation in atmospheric pressure over the range of 28.00 to 31.50 inches of mercury, it is necessary to introduce some kind of mechanical nonlinear motion to make possible a correct indication of the altitude adjustment.

SUMMARY OF THE INVENTION

It is, accordingly, an object of the present invention to provide a nonlinear mechanical device capable of converting a rotary input to a rotary output which does not vary in a linear manner with the rotary input, and which is suitable for providing altitude corrections in aircraft altimeters in response to variations in atmospheric pressure settings.

According to the present invention, there is provided a rotatable cylindrical slotted cam responsive to rotary input motion, and having a shaped way disposed on the cylindrical surface thereof, an annular cam follower slidably mounted on and surrounding the cylindrical surface of said cam and having on its inner annular surface follower means engaging the shaped way and constraining the annular cam follower to rotate with the cylindrical element (subject to the constraint of the follower means to follow the shaped way on the cylindrical surface of the cylindrical element), means constraining the cam follower to slide axially along the cylindrical cam in response to the rotation of either the cam follower or of the cylindrical element, rotation of the annular element constituting rotary output motion related to the input motion is a nonlinear functional relationship depending upon the shape of the shaped way on the cylindrical element and the rate of axial travel of the cam follower along the cam. The cylindrical cam is directly coupled in the altimeter to the altitude-representative indicator and the annular cam follower is directly coupled to the pressure-representative indicator, thus enabling a given change in pressure setting to be correlated with an equivalent change in altitude according to the nonlinear relationship between pressure and altitude.

In a preferred embodiment of the present invention, the cylindrical cam is provided with a groove and the cam follower is provided with a tongue on its inner annular surface which engages the groove, and the means constraining the cam follower to move axially along the cylindrical cam is a pinion meshing with a toothed portion of the periphery of the cam follower and having its inner annular surface threaded and mounted on a screw thread which is axially parallel to the axis of the cam, whereby the rotary motion of the cam follower causes the mating pinion to move axially along the threaded shaft, thereby constraining the cam follower to move axially along the cylindrical element on which it is slidably mounted.

DETAILED DESCRIPTION WITH REFERENCE TO THE DRAWINGS

Figure 1:
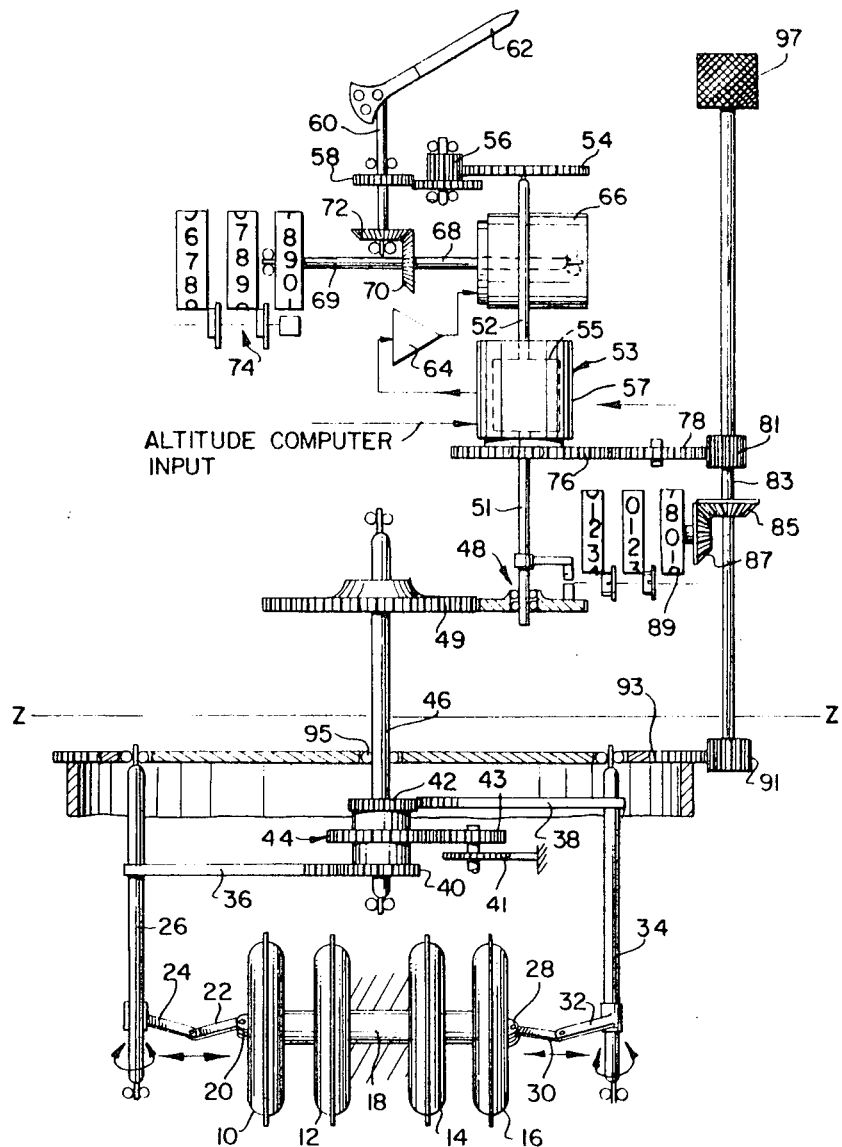
FIG. 1 is a schematic block diagram of an altimeter arrangement in which the nonlinear device according to the present invention can be utilized.

Referring to FIG. 1, aneroid capsules 10, 12, on the left-hand side and 14, 16 on the right-hand side, are mounted on central mounting piece 18 which is fixed to the frame of the altimeter (not shown in FIG. 1). A pressure decrease results in expansion of the hub portions of the aneroid capsules and in the case of the left hand pair of capsules 10, 12, is transmitted via hub connections (not shown in FIG. 1) to a hub connecting post 20 which is pivotally attached to a link 22 which in turn is pivotally attached to a crank 24 fixed to a rotatably mounted shaft 26. Corresponding elements 28, 30, 32 and 34 are shown connected to the right hand pair of aneroid capsules 14, 16. Because altitude is not linearly related to pressure variation, the linkage 22, 24 and 28, 32 is nonlinear in accordance with conventional altimeter design.

The inward or outward motion of the post 20, caused by contraction or expansion of the aneroid capsules 10, 12, is converted by link 22 and crank 24 to rotary motion of the shaft 26. The shaft 26 is rigidly connected to a quadrant gear 36 of conventional design, and similarly the right hand shaft 34 is connected to a quadrant gear 38. The quadrant gears 36, 38 drive pinions 40 and 42 respectively, each of which constitutes an input to a differential gear assembly 44. The differential assembly is preferably of the type described in a copending application entitled "Differential Output for Barometric Instrument" (Graham A. Ireland et al.), filed on the same day as the present application. The output of the differential gear assembly is transmitted to an output shaft 46 and thence to gear 49, which in turn drives input gear 50 of a spring-loaded coupling generally designated as 48 and which is preferably of the type described in a copending application entitled "Flexible Rotary Coupling" (Graham A. Ireland et al.), filed on the same day as the present application. The spring-loaded coupling 48 in turn drives shaft 51 through the rotor 55 of synchro-control transformer 53 to shaft 52 (an extension of shaft 51) and thence to rotary gears 54, 56 and 58 to an output indicator shaft 60 to which is attached an indicating pointer 62. The shaft 60 through bevel gears 70, 72 drives shaft 68 and Veeder-type counter 74. Pointer 62 and counter 74 indicate the altitude reading.

A coil spring 41 fixed to the instrument frame is directly coupled to pinion 43 meshing with gear 44, applying a force thereto which tends to avoid backlash in the mechanical drive from the aneroid capsules to the output shaft 46.

For the purposes of the schematic drawing, pointer 62 and mechanical linkage elements 20, 22, 24, 28, 30 and 32, are shown in plan and perspective although the other elements are shown in elevation view.

In accordance with modern practice, altitude readings may also be obtained from altitude computing apparatus (not shown) whose output is applied via control transformer 53 and operational amplifier 64 to a servo motor 66 which also drives shaft 68. Thus, the altitude reading may come either from the servo input via motor 66 and shaft 68 or from the aneroid input via shaft 52. In order that the mechanism function satisfactorily in case the two inputs are not identical, as will often happen, the flexible coupling 48 absorbs the discrepancy in input without unduly stressing any portion of the mechanical system. The outer casing of the synchro-control transformer 53 is rotatable and may be turned by annular gear 76 fixed to the outer periphery of the synchro-control transformer 53.

Annular gear 76 is driven via idler 78 by pinion 81 mounted on shaft 83. Also mounted on shaft 83 is bevel gear 85 and pinion 91. The bevel gear 85 drives meshing bevel gear 87 which in turn drives barometric counter assembly 89, which is preferably of the type described below with reference to FIGS. 2 to 6. Shaft 83 may be turned manually by a knob 97 attached to one end of the shaft 83.

The entire casing for the aneroid portion of the unit terminates in an uppermost plate 93 whose outer periphery is toothed to mesh with pinion 91. Bearings 95 interposed between shaft 46 and the plate 93 permit the entire aneroid assembly to rotate about the shaft 46 as the knob 97 is turned. Turning the knob 97 also has the effect of rotating the annular gear 76 and thus the outer casing of the synchro-control transformer 53.

The purpose of having the manually adjustable knob 97 and the mechanism associated immediately therewith is to permit the operator of the instrument to set the barometric counter 89 to the datum pressure. According to conventional specifications, the altitude computer will be designed to an assumed barometric pressure of 29.92 inches of mercury. The operator of the altimeter, e.g., an aircraft pilot, will have to be able to adjust the instrument to some other datum pressure for the purpose of landing and taking off, because it is essential that the instrument give a correct altitude reading according to actual prevailing conditions at the critical landing and takeoff times.

It can be seen that the knob 97 affects both the altitude computer mode of operation and the aneroid mode of operation. When the knob 97 is turned, the casing for the synchro-control transformer 53 rotates, thus rotating the stator to which it is attached, and varying the electric field so that an error signal sent to operational amplifier 64 causes the motor 66 to turn sufficiently to adjust the error to zero, which is accomplished via the gear-linking shaft 68 to shaft 52. The barometric output is altered when knob 97 is turned, simply by rotating the entire aneroid assembly via pinion 91 and toothed casing plate 93. Obviously the mechanical and electrical effects of a given angle of rotation of the knob 97 must be correlated with one another and with the reading of barometric pressure appearing to the instrument operator on the barometric counter 89. The specific design parameters of this portion of the assembly will be readily apparent to those skilled in the technology for any given servo input, aneroid input and indicating mechanism. The present invention is not concerned with these specifics but rather with the utilization of the counter 89 and the nonlinear device incorporated therein.

Figure 2:
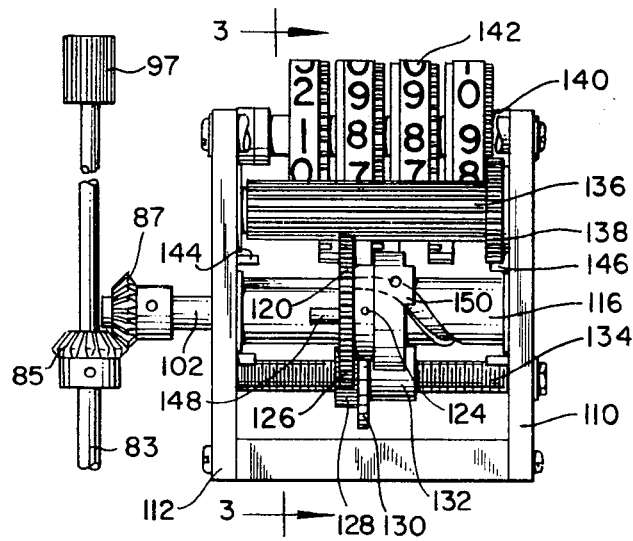
FIG. 2 is a front elevation view of a counter employing a nonlinear device according to one embodiment of the present invention.
Figure 3:
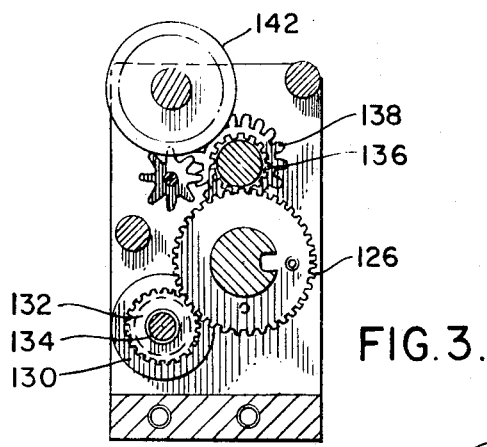
FIG. 3 is a side elevation view of the counter illustrated in FIG. 2.
Figure 6:
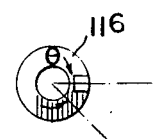
FIG. 6 is an end elevation of the slotted cam of FIG. 5.
Figure 4:
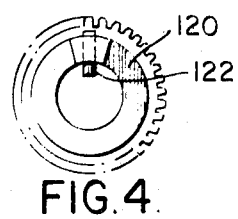
FIG. 4 is an end elevation view of the annular cam follower of the device shown in FIG. 2.
Figure 5:
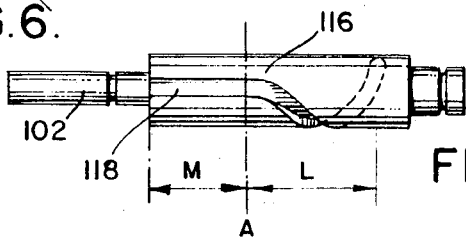
FIG. 5 is a front elevation view of the cylindrical slotted cam of the device shown in FIG. 2.

Referring to FIGS. 2 and 3, a nonlinear counter arrangement is shown which is suitable for installation in the aircraft altimeter as an altitude-datum pressure adjustment device, and in particular may serve as counter 89 in the altimeter of FIG. 1. The device is operable by a manually rotatable knob 97 which drives an input shaft 83 to vary the altitude reading. A bevel pinion gear 85 is mounted on shaft 83 and meshes with bevel pinion 87 which drives input shaft 102 of the nonlinear counter. The shaft 102 is rotatably mounted in a frame 110, between whose end support plates 112, 114, is rotatably mounted a cylindrical slotted cam 116 fixed to the shaft 102 (and may be integral with the shaft 102). The slotted cam 116, shown in expanded view in FIG. 5, is provided with a circumferential groove 118, whose shape will be explained below.

Slidably mounted on the cylindrical surface of the cylindrical element 116 is an annular cam follower element 120, having a cam follower in the form of a tongue 122 (see FIG. 4) projecting inwardly from the inner annular surface of the annular element 120.

The annular element 120 is provided with a recessed peripheral portion 124 and a toothed peripheral portion 126. The annular element 120 meshes with a gear wheel 128 having a smooth peripheral portion 130 of relatively large diameter and a recessed portion 132 of smaller diameter. The inner annular surface of the gear wheel 128 is threaded and the gear wheel 128 threadably engages a threaded shaft 134 which is fixed to the frame 110 and does not rotate. The spacing between the shaft 134 and the cylindrical element 116 and the dimensions of components 124 and 128 are selected so that the gear wheel 128 mates with the annular element 120, the larger peripheral portion 130 of the gear wheel 128 engaging the recessed peripheral portion 124 of the annular element 120, and the toothed portions of the two rotatable members 120, 128, meshing.

The toothed peripheral portion 126 of the annular element 120 also drives the elongated pinion 136 to which is attached a coaxial gear 138 which drives the "hundredths of an inch" counter wheel 140 of a conventional Veeder-type counter 142. The structure of the Veeder-type counter 142 can be completely conventional and is not per se a part of the present invention.

It will thus be seen, from the above description, that as the knob 97 is rotated, the altitude indicator connecting shaft 83 will rotate in direct linear relationship with the rotation of the knob 97. However, the counter 142 will not move in direct linear relationship with the rotational motion of the knob 97, but rather the number of revolutions of the input pinion for the counter 142 will depend upon the lag of the annular element 120 with respect to the cylindrical element 116 along which it slides. The shape of the slot 118, the gear ratios, and the pitch of the screw threads on the shaft 114 will, therefore, govern the specific functional relationship of the motion of input counter wheel 140 with respect to the knob 97 (and thus with respect to the altitude indicator connecting shaft 83).

It is convenient to select the pitch of the screw thread of shaft 134 such that the annular cam follower 120 can make a complete axial journey from the support plate 112 to the support plate 114 within the pressure range, in inches of mercury, desired to be recorded on the Veeder-type counter 142. As mentioned above, the extreme pressure variations that can be expected suggest a pressure range on the counter 142 of 28.00 inches to 31.50 inches of mercury. Accordingly, 35 revolutions of the input counter wheel 140 should be possible within the axial limits of travel of the cam follower 120 between plates 112 and 114.

Stops 144 and 146 are provided to limit the axial travel of cam follower 120. A pin 148 on the cam follower 120 strikes stop 144 to determine the left-hand limit of axial travel, and a projection 150 on the cam follower 120 strikes pin 146 to determine the right-hand limit of axial travel of the cam follower 120. The location and dimensions of the stops 144, 146 are chosen so that the counter displays a pressure reading 28.00 inches of mercury at one axial limit and a reading of 31.50 inches at the other axial limit, for the example mentioned above.

The variation of altitude reading with changes in ambient atmospheric pressure is known from the "Standard Day Tables" published by the International Civil Aviation Organization. These establish the correct functional relationship of ambient pressure, in inches of mercury, to altitude. By plotting the appropriate values on a graph, and by properly selecting the shape of the groove 118, the gear ratios, the axial dimensions of the cylinder 116 and the pitch of the screw thread on shaft 134, the correct pressure-altitude nonlinear relationship can be introduced into the mechanism illustrated in FIGS. 2 and 3.

It will be apparent that the same or a similar nonlinear device could be used for other nonlinear functional relationships in indicating instruments or other mechanical linkages requiring a rotary input and a rotary output that varies in nonlinear relationship with the input. Furthermore, it will be apparent that details of the apparatus illustrated in FIGS. 2 and 3 need not be duplicated exactly in order to utilize the principles of the present invention. For example, instead of having a groove 118 in the cylinder 116 and a matching tongue 122 in the cam follower element 120, this male-female relationship could be reversed with the cylinder 116 provided with an outwardly projecting way 118 and the annular element 120 provided with a mating recess following the projection of the cylindrical surface of the cylinder 116. Similarly, the recess 124 in the cam follower 120 could be replaced by a protruding peripheral portion mating with a recessed portion on the threaded gear pinion member 128. These mechanical details are not in themselves significant; obvious equivalents will occur to those skilled in the technology. Likewise, it is not necessary that the nonlinear device of FIG. 2 be employed in conjunction with a Veeder-type counter; the nonlinear output available from the toothed periphery of the cam follower 120 can be applied to any other mechanism accepting a rotary input.

Equally obviously, the nonlinear functional relationship can take many forms, and thus the way 118 may vary in shape considerably from application to application. However, there are two points to be observed in the design of the mechanism. First, the axial direction of motion of the cam follower 120 should be arranged with respect to its rotary motion such that frictional binding of the tooth 122 in the groove 118 is avoided. This implies that the direction of curvature of the way 118 should in general never reverse, but should always be a single direction (whose angle of inclination is, however, permitted to vary), and that the cam follower should, in general, always lag the slotted cam. Instead of a lag, a very slight lead of a very few degrees per revolution, is possible, but it is not recommended. Usually it will be possible to select the more rapidly changing rotary motion as the input motion and to design the gear ratios, etc. so that the cam follower always lags the cam.

A specific example of a nonlinear device according to the invention will now be described with reference to the specific problem of altitude-pressure correction in an aircraft altimeter, but this example should not be interpreted as restricting the invention to this particular use of the nonlinear device according to the invention, which can be used in other mechanical applications in which one rotary motion is required to be converted to another rotary motion in a nonlinear functional relationship.

EXAMPLE

According to the Standard Day Tables provided by the International Civil Aviation Organization, the relationship of pressure in inches of mercury to altitude differential over the range 28.00 inches of mercury to 31.50 inches of mercury is determined. Also, the functional relationship is plotted to obtain a curve showing the rate of change of altitude correction for a given pressure change. It is noted that pressure changes less rapidly than altitude and therefore the mechanism is designed so that the adjusting knob 97 directly (linearly) adjusts the altitude reading and indirectly adjusts the pressure reading via the nonlinear counter 89. This permits the cam follower 120 to lag the rotary movement of the slotted cam 116, as required. The lag of course will not be constant but will vary according to the functional relationship established by the Standard Day Tables.

The shape of the curved way 118 may be defined by stating the angle $\Theta$ of circumferential displacement of the curve from the straight line section of the curve over the distance M. The straight section M is merely provided to permit initial mounting of cam follower 120 on slotted cam 116, and has nothing to do with the functional relationship between the cam and follower. The tongue 122 is positioned on the right-hand side, in this example, of cam follower 120, and thus, because of the thickness of the cam follower 120, the tongue will be at point A when the left-hand side of cam follower 120 abuts against wall 112.

Beginning at point A and proceeding over the axial length L, a suitable shape for way 118 is defined as follows:

| Distance from Point A in inches | Angle $\Theta$ | Distance from Point A in inches | Angle $\Theta$ |
| --- | --- | --- | --- |
| 0 | 0 | 0.264 | +54°40' |
| 0.022 | −0° 54' | 0.286 | +66°15' |
| 0.044 | −0° 50' | 0.308 | +78°40' |
| 0.066 | +0° 30' | 0.330 | +92° 0' |
| 0.088 | +2° 20' | 0.352 | +106°55' |
| 0.110 | +4° 50' | 0.374 | +122°30' |
| 0.132 | +8° 30' | 0.396 | +139°50' |
| 0.154 | +13°15' | 0.418 | +157°45' |
| 0.176 | +19°10' | 0.440 | +177°15' |
| 0.198 | +26°12' | 0.462 | +198°25' |
| 0.220 | +34°30' | 0.484 | +220°30' |
| 0.242 | +44° 0' | 0.506 | +243°50' |
|  |  | 0.513 | +252°05' |

(27)$\Theta$It will be observed that for the first two positions, at distances of 0.022 inches and 0.044 inches respectively, the angle $\Theta$ has been made a negative angle. This does accommodate the functional relationship between pressure and altitude more precisely that a 0° angle of the inclination would, but the negative angle at this part of the curve violates the principle expressed above that the cam follower 120 should always lag the slotted cam and that the curvature should always be in the same direction. It has been found experimentally that a very small negative angle of inclination, in this case less that 1°, has not caused binding sufficiently serious to disrupt the operation of the mechanical device, but because of the risk of any binding at all it may be preferable to have the angle of inclination, at 0.022 inches and 0.044 inches, 0° rather than a slight negative angle, because the inaccuracy introduced thereby will probably not be deemed to be sufficiently significant to offset the risk of binding.

With the above figures for the relationship of the angle of inclination of the curved way 118 over the total distance L of 0.513 inches, the following additional parameters establish the proper functional relationship between the pressure in inches of mercury on the Veeder counter and the required altitude correction, over the range 28.00 inches of mercury to 31.50 inches of mercury.

Number of teeth on internally threaded gear 128: 20 teeth.
Pitch of thread on threaded shaft 134: 64 threads per inch.
Number of teeth on elongated pinion 136: 15 teeth.
Number of teeth on pinion 138: 32 teeth.
Number of teeth on input Veeder element 140: 40 teeth.

(Note that cam follower 120 behaves as an idler in the system of gears and thus the number of teeth on its toothed periphery is not critical. In a prototype model, 39 teeth were used).

With the above parameters, the shaft 102 makes 17.524 revolutions, the cam follower 120 makes 16.827 revolutions, to give the required number of counter revolutions of the Veeder counter wheel 140 of 35 revolutions, over the axial length of travel L of the cam follower element 120. The shape of the way 118 and the ratio 16,827 to 17,524 are such that the correct altitude-pressure nonlinear relationship is introduced into the mechanism, for the pressure range 28.00 to 31.50 inches of mercury, which corresponds to an altitude change of 3,255 feet. The relationship between the rotary motion of shaft 83 and the altitude indicating mechanism is linear, so all that is required is that the altitude indicator give a reading that is 3,255 feet higher at 31.50 inches of mercury than the reading at 28.00 inches of mercury. (The reading at 29.92 inches of mercury is set to 0 feet.) This is a standard altimeter design problem requiring ordinary skill, and its solution will depend on the specific altimeter indicating mechanism used and on the design of the gear train linking the indicating mechanism with the shaft 83.

In the example described and illustrated, the way 118 makes less than a full revolution about slotted cam 116 from one axial limit to the other. However, this is not essential, in general. Other nonlinear functional relationships may require a way that advances through more than 360° from one axial limit to another.

What I claim as my invention:

1. In or for use with an altimeter having a pressure-representative indicator and an altitude-representative indicator, a nonlinear rotary motion conversion device, comprising a cam with an elongated way for rotation therewith, said cam being directly coupled to said altitude-representative indicator, and a cam follower rotatable coaxially with the cam and directly coupled to the pressure-representative indicator, and means coupled with the cam or the cam follower for causing the cam follower to move along the way in dependence upon the rotation of the cam whereby the rotary motion of the cam follower coaxially with the cam is a function dependent upon the shape of the way of the rotary motion of the cam, thereby permitting a given variation in indicated pressure to be correlated with an equivalent variation in indicated altitude according to said function.

2. In order for use with an altimeter having a pressure-representative indicator and an altitude-representative indicator, a rotary motion conversion device comprising a cylindrical cam directly coupled to said altitude-representative indicator and having a way on the cylindrical surface thereof, an annular cam follower directly coupled to the pressure-representative indicator and coaxially slidable on the cam and having engaging means fixed to the cam follower for engaging said way, so that the circumferential position of the cam follower with respect to the cam is determined by the circumferential location of the way on the cam at the coaxial position along the cam of the engaging means, and advancing means for advancing the cam follower coaxially along the cam in response to rotation of the cam, the way being shaped in dependence upon a predetermined pressure-altitude function whereby rotary motion of the cam is converted to rotary motion of the cam follower according to said function thereby to correlate a given variation in the pressure indicated by the pressure-representative indicator with an equivalent variation in altitude indicated by the altitude-representative indicator according to said nonlinear function determined by the shape of the way and the rate of advance of the cam follower along the cam between its axial limits.

3. A device as defined in claim 2, wherein the advancing means advances the cam follower axially along the cam in response to rotation of the cam follower.

4. A device as defined in claim 2, wherein the advancing means is an internally threaded gear threadably engaging a threaded shaft parallel to the axis of the cam and meshing with a gear driven by the cam.

5. A device as defined in claim 4, wherein the gear is the cam follower.

6. A device as defined in claim 4, wherein the way is a slot and the engaging means is a tongue on the inner annular surface of the cam follower.

7. A device as defined in claim 6, wherein the slot is curved so that the cam follower never leads the cam by more than 5 degrees in any revolution.

8. A device as defined in claim 7, wherein the slot is curved so that the cam follower always lags the cam.

* * * * *

UNITED STATES PATENT OFFICE
CERTIFICATE OF CORRECTION

Patent No. 3,631,722       Dated  January 4, 1972

Inventor(s)  John Richard B. Steacie

It is certified that error appears in the above-identified patent and that said Letters Patent are hereby corrected as shown below:

Claim 4 should read as follows:

-- A device as defined in Claim 3, wherein the gear driven by the cam is the cam follower.--

Signed and sealed this 25th day of July 1972.

(SEAL)
Attest:

EDWARD M. FLETCHER, JR.            ROBERT GOTTSCHALK
Attesting Officer                  Commissioner of Patents

UNITED STATES PATENT OFFICE
CERTIFICATE OF CORRECTION

Patent No. 3,631,722         Dated September 12, 1972

Inventor(s) John Richard B. Steacie

It is certified that error appears in the above-identified patent and that said Letters Patent are hereby corrected as shown below:

Claim 2, line 1, "order" should read:

-- or --

Claim 5 should read as follows:

-- A device as defined in Claim 4, wherein the gear driven by the cam is the cam follower. --

Signed and sealed this 28th day of November 1972.

(SEAL)
Attest:

EDWARD M. FLETCHER, JR.
Attesting Officer

ROBERT GOTTSCHALK
Commissioner of Patents